May 19, 1959 R. C. WEBSTER 2,887,625
ELECTRICAL MEASURING INSTRUMENT
Filed Nov. 17, 1955
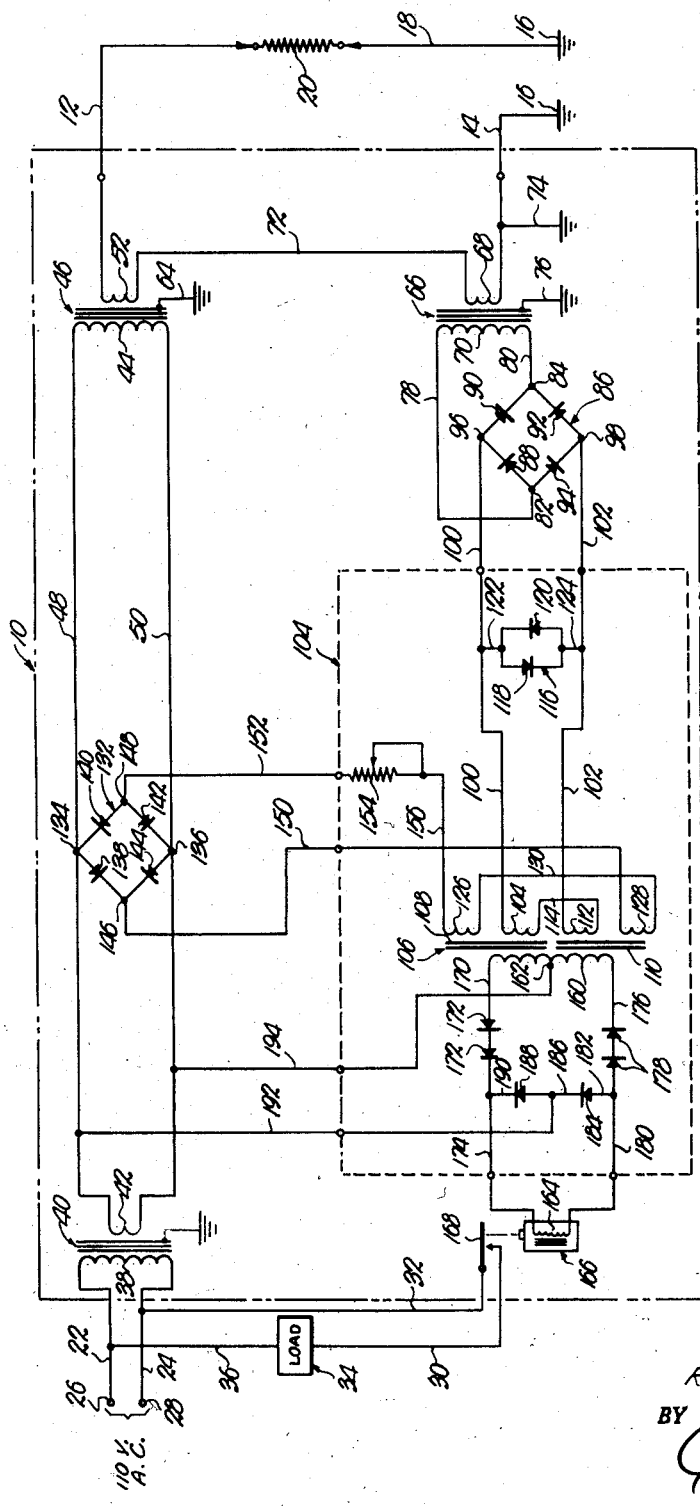
Fig. 1.
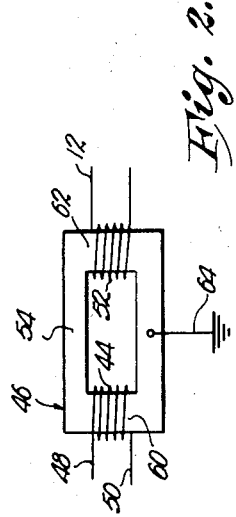
Fig. 2.
INVENTOR.
Raymond C. Webster
BY
ATTORNEY.

United States Patent Office 2,887,625
Patented May 19, 1959

2,887,625

ELECTRICAL MEASURING INSTRUMENT

Raymond C. Webster, Kansas City, Mo., assignor to W. E. Anderson, Inc., Kansas City, Mo., a corporation of Missouri Application November 17, 1955, Serial No. 547,371

12 Claims. (Cl. 317—157)

This invention relates generally to an electrical measuring instrument and, more particularly, to electrical measuring circuitry adapted for use as a control circuit in controlling the operation of an electrically operable device responsive to the measured value of an unknown resistance.

Although the apparatus of this invention is adapted for employment in many applications wherein an accurate measurement of an unknown resistance, particularly one of quite low value, is to be made, it has been found especially advantageous for use in surroundings where there would be danger from explosion or the like if a measuring or control instrument were used which would create an exposed spark upon connection or disconnection to the structure whose resistance is to be measured. Still more specifically, the apparatus contemplated by this invention is particularly suited for use in measuring the resistance between the metallic tank or body of a gasoline truck and ground, such as is necessary for assuring that such tank body has been properly grounded before pump activating or other machinery located at a tanker filling station may be safely activated to fill the tank.

Accordingly, it is the primary object of this invention to provide measuring and control apparatus which will be safe for use in such danger areas and which will accurately measure the value of an unknown resistance and from such measurement control the operation of an electrical device.

It is another important object of this invention to provide control circuitry for selectively closing and opening an electrical switch responsive to critical measurements of an unknown resistance of low value.

It is another important object of this invention to provide such apparatus which will use only components which are readily and inexpensively available and which are of nature adapted for giving long and reliable service without the need for maintenance or replacement and which are not subject to aging that would change the operating parameters of the circuitry.

Still other important objects of the invention, including certain important details of construction, will be made clear or become apparent as the following description of the invention progresses.

In the accompanying drawings:

Fig. 1 is a schematic diagram of the apparatus contemplated by this invention; and Fig. 2 is a more detailed diagrammatic representation of one of the transformers employed in the apparatus.

Referring now to the embodiment of the apparatus shown in the drawing, there is indicated by the dotted line generally designated 10 an explosion-proof housing or covering, which may be of any conventional type, within which the entire measuring portion of the apparatus of this invention is housed. Emanating from explosion-proof housing 10 are a pair of conductors 12 and 14. Conductor 12 is adapted for attachment to one extremity of an unknown resistance 20 to be measured, and the conductor 14 is adapted for attachment to the opposite end of the resistance 20, the connection illustrated being through coupling with an external ground 16 to which same ground 16 the end of resistance 20 opposite conductor 12 is to be connected by a conductor 18. The connection just described is the one applicable in the case of gasoline trucks or the like where the resistance 20 represents the electrical resistance existing between the metallic tank or body of the truck and ground 16, the connection 18 being one that is to be made by the workmen before filling the tank and whose effectiveness is to be checked before the tank filling machinery is activated. Obviously, in other applications, the conductor 14 could be coupled directly with the end of resistance 20 opposite conductor 12.

Also emanating from explosion-proof housing 10 are a pair of power lines 22 and 24 adapted for connection with a conventional power main or source represented by a pair of terminals 26 and 28. An additional pair of conductors 30 and 32 emanate from the explosion-proof housing 10 and constitute the circuit controlled by the apparatus contemplated by the invention by means of a switch within the latter hereinafter to be identified and described. In a typical installation the conductor 32 will be coupled with one of the power lines 24, and the conductor 30 will be coupled with a load generally indicated at 34, which may be an electrical pump operating motor or the like, and which is in turn coupled with the other power line 22 through a conductor 36.

Power lines 22 and 24 are coupled with a primary winding 38 of a voltage step-down transformer 40 having a low voltage secondary winding 42 coupled with a primary 44 of a second voltage step-down transformer 46 by conductors 48 and 50.

Step-down transformer 46 is provided with a secondary winding 52 and, as more particularly illustrated in Fig. 2, with a ring-like metallic core 54 which may be either annular or polyganol, as illustrated. Core 54 includes separated portions 60 and 62 upon which windings 44 and 52 are respectively wound. Such construction obviates any possibility of a short developing between windings 44 and 52 which would impose a higher voltage than desired upon the secondary winding 52, it being noted that the metallic core 54 is grounded by a conductor 64.

The windings of transformers 40 and 46 are provided with turns ratios presenting approximately 24 volts of alternating current across secondary winding 42 and approximately .15 volt of alternating current voltage across secondary winding 52 when primary 38 of transformer 40 is coupled with a 110 volt alternating current source 26—28.

It is extremely significant that the material used for core 54 of transformers 46 is such that, with the particular number of turns used in winding 44 and the voltages normally applied thereto, the core 54 is already fully saturated. This means that, even if the voltages applied to windings 44 were as a result of some unforeseen circumstance or break-down greatly increased, still the output voltages on windings 52 would remain virtually at the same low and safe level.

Another transformer 66 identical to transformer 46 in construction is provided and has a primary winding 68 and a secondary winding 70, it being noted that the transformer 66 is coupled oppositely to transformer 46 to perform a voltage step-up function.

Conductor 12 is coupled with one side of secondary winding 52 of transformer 46 and the other side of winding 52 is coupled by a conductor 72 with one side of the primary winding 68 of transformer 66. The other side of primary winding 68 is coupled with conductor 14 and, by means of a conductor 74 with ground. The core 54 of transformer 66 is grounded by a conductor 76.

Secondary winding 70 of transformer 66 is coupled by conductors 78 and 80 with input terminals 82 and 84 respectively, of a full wave bridge rectifying circuit 86 utilizing four (4) germanium power rectifiers 88, 90, 92 and 94 and having a pair of output terminals 96 and 98. It is important that the rectifiers 88, 90, 92 and 94 be of a type having low power consumption, and the preferred components are junction type, germanium rectifiers such as that available on the market under the designation GE1N91, which has a very low forward resistance and, therefore, low power consumption.

Terminals 96 and 98 are coupled by conductors 100 and 102 respectively with what may be broadly denominated a magnetic amplifier unit designated by the numeral 104 and indicated by the dotted line box 104 in Fig. 1. More particularly, conductor 100 is coupled with an input winding 104 of a magnetic amplifier transformer generally designated 106 and having a pair of cores 108 and 110, winding 104 being associated with core 108. Similarly, conductor 102 is coupled with an input winding 112 associated with core 110 of magnetic amplifier transformer 106. The other ends of windings 104 and 112 are interconnected by a conductor 114.

Coupled between conductors 100 and 102 is a voltage clipping circuit broadly designated 116, which includes a pair of oppositely oriented selenium rectifiers 118 and 120 coupled by conductive means 122 and 124 in parallel between conductors 100 and 102. It may be noted that with an alternating current output of approximately .15 volt from secondary winding 52 of transformer 46, when applied through a resistance 20 of the order of one ohm will produce a direct current voltage between terminals 96 and 98 of the order of 5 volts or less. The purpose of clipper circuit 116 is to limit the voltage between terminals 96 and 98 which might result from either a breakdown of magnetic amplifier transformer 106 or unwanted transient back voltages from windings 104 and 112 to a value of the order of 5 volts or less.

Transformer 106 is also provided with a pair of biasing input windings 126 and 128, winding 126 being associated with core 108 and winding 128 being associated with core 110. An end of each of the windings 126 and 128 are interconnected by a conductor 130.

A rectifying circuit generally designated 132 has its input terminals 134 and 136 respectively coupled with conductors 48 and 50. Rectifier unit 132 utilizes four (4) selenium rectifiers 138, 140, 142 and 144 and has a pair of output terminals 146 and 148.

Output terminal 146 of rectifier 132 is coupled by a conductor 150 with the other end of bias input winding 128 of transformer 106 within magnetic amplifier 104. Rectifier output terminal 148 is coupled through a conductor 152, a bias control rheostat 154 and a conductor 146 with the other terminal of bias input winding 126.

It is significant that the respective couplings between rectifier unit 86 and windings 104 and 112 and rectifier unit 132 and windings 126 and 128 are such that the biasing voltage applied to windings 126 and 128 "bucks" or opposes the action of a voltage applied to windings 104 and 112 upon the cores 108 and 110.

The magnetic amplifier transformer is provided with an output or secondary winding 160 having a center tap 162. In conventional parlance, the core 108 and its input windings 112 and 128 each constitute a separate magnetic amplifier reactor having a common output winding 160. As will be more fully explained in connection with the operation of the apparatus, the biasing voltage from rectifier unit 132 is adjusted by rheostat 154 so as to oppose the action of a voltage applied to windings 104 and 112 sufficiently to maintain the cores 106 and 110 just below the saturation point when the resistance 20 is just in excess of a predetermined, desired, maximum permissible value.

The output of magnetic amplifier 104 is fed to an operating coil 164 of a relay broadly designated 166 having a normally open switch 168, which is adapted to close when the coil 164 is energized by the flow of a predetermined amount of current therethrough. As will be clear from Fig. 1, switch 168 is coupled in series between conductors 30 and 32 of the controlled circuit for load 34.

One end of winding 160 is coupled with one end of coil 164 by a conductor 170, one or more series-connected selenium rectifiers 172 and a conductor 174, rectifiers 172 being oriented for the flow of current from winding 160 to coil 164. Similarly, the other side of winding 160 is coupled by a conductor 176, one or more series-connected selenium rectifiers 178 and a conductor 180 with the other side of coil 164, the rectifiers 178 being oriented for the flow of current from coil 164 to winding 160.

Conductors 180 and 174 are coupled by a conductor 182, a selenium rectifier 184, a conductor 186, a selenium rectifier 188, and a conductor 190 connected in series in the order named from conductor 180 to conductor 174. Rectifiers 184 and 188 are oriented for the flow of current from conductor 180 to conductor 174. Conductor 186 is coupled with conductor 48 by a conductor 192, and center tap 162 of winding 160 is coupled by a conductor 194 with conductor 50.

In understanding the operation of the apparatus just described, it is necessary first to observe that alternating current carried from conductors 48 and 50 by conductors 192 and 194 to conductor 186 and center tap 162 respectively will normally tend to flow during one half cycle from conductor 50 through conductor 94, center tap 162, the uppermost half of winding 160, conductor 170, rectifiers 172, conductor 174, coil 164, conductor 180, conductor 182, rectifier 184, conductor 186, and conductor 192 to conductor 48, and during the other half cycle, from conductor 48 through conductor 192, conductor 186, rectifier 188, conductor 190, conductor 174, coil 164, conductor 180, rectifier 178, conductors 176, the lower-most half of winding 160, center tap 162 and conductor 194 to conductor 50. From this, it will be apparent that the direction of current flow through each of winding 160 and coil 164 is limited to one direction. It is also significant to note that the input windings 126 and 128 are so arranged upon magnetic amplifier transformer 106 that a pulsating, rectified direct current voltage from rectifier unit 132 applied to such windings 126 and 128 will oppose the flow of alternating current from conductors 192 and 194 through the circuits just traced, including output winding 160 and coil 164. By such action, the biasing current applied to windings 126 and 128 is utilized by proper adjustment of rheostat 154 to maintain cores 108 and 110 below saturation so that the impedance presented by winding 160 to the alternating current from conductors 192 and 194 will be sufficiently high to limit the rectified current flowing through coil 164 to a value insufficient to energize the same for closing the switch 168.

As above noted, the input windings 104 and 112 are in turn arranged to oppose the action of windings 126 and 128 so that, when a current of predetermined magnitude from rectifier unit 86 is applied to windings 104 and 112, the cores 108 and 110 will become saturated, thereby greatly decreasing the impedance of winding 160 to a point permitting sufficient flow of alternating current from conductors 192 and 194 through the circuits above traced and coil 164 to energize the latter and close switch 168.

It will now be readily understood by those skilled in the art that by the use of proper transformer turns ratios, supply voltages, and the adjustment of rheostat 154, the apparatus may be adapted to control the closing of switch 168 in such manner that the latter will be closed only when the resistance 20 is less than some predetermined value, the value usually used in connection with testing the grounding of gasoline tanks being of the order of 5 ohms. It will also be now perceived that if at any time during the testing of the value of the resistance 20, which is continued during the entire period of filling a gasoline tank, the resistance 20 should increase above the predetermined, permitted maximum, the cores 108 and 110 will be immediately biased to below saturation, thereby increasing the impedance of winding 160 to de-energize coil 164 and open switch 168, which in turn will cut off the supply of power to the load 34 to be controlled. It may also be pointed out as significant that the actual testing connections to the resistance 20 and the latter carry such low amounts of current and voltage that no danger of sparking is presented.

Those skilled in the art will readily appreciate that certain minor modifications and changes could be made from the exact structure shown and described for purposes of illustration or in connection with the use to which the apparatus may be put without materially departing from the true spirit or intention of the invention. Accordingly, it is to be understood that the invention shall be deemed limited only by the scope of the appended claims.

Having thus described the invention, what is claimed as new and desired to be secured by Letters Patent is:

1. In a resistance measurement responsive control circuit, a pair of terminals adapted to have a passive resistance of unknown value coupled therebetween; a two-state device whose state of actuation is to be controlled responsive to the value of said resistance, said device being operable only when an electrical current of at least some predetermined magnitude is passed therethrough; a source of alternating current, electrical power; an operating circuit for said device coupling said device with said power source; a source of electrical biasing current; apparatus coupling said biasing source with said operating circuit, said biasing current opposing the flow of current from said power source to said operating circuit and through said device to normally limit same to a magnitude below said predetermined magnitude; and a measuring circuit having said terminals coupled in series therewith, said measuring circuit electrically coupling said power source with said apparatus, said apparatus being arranged for current flowing in the measuring circuit opposing the opposition of said biasing current to the flow of current in said operating circuit, whereby, only when said resistance is below a predetermined value, current of at least said predetermined magnitude will flow in said operating circuit to operate said device.

2. In a control circuit as set forth in claim 1, wherein said device comprises a relay having a switch to be operated and a switch operating coil coupled with said operating circuit.

3. In a control circuit as set forth in claim 1, wherein said apparatus includes a magnetic amplifier having an output winding coupled in series with said operating circuit and an input winding coupled with said biasing source.

4. In a control circuit as set forth in claim 1, wherein said operating circuit includes a number of unidirectionally conductive elements arranged to permit the flow of electrical current through said device in one direction only, said source being coupled with said operating circuit in a manner tending to induce a flow of current in the latter in the opposite direction.

5. In a control circuit as set forth in claim 4, wherein said biasing source includes a rectifier unit coupled with said power source, and said apparatus includes a magnetic amplifier having an output winding coupled in series with said operating circuit and an input winding coupled with said unit and arranged relative to said output winding for inducing a voltage in said output winding opposite to the voltage imposed across the latter by the flow of current directly from said power through said operating circuit.

6. In a control circuit as set forth in claim 1, wherein said apparatus includes a magnetic amplifier having an output winding coupled in series with said operating circuit and a pair of input windings, said input windings being arranged in electrically opposing relationship to each other, one of said input windings being coupled with said biasing source, the other of said input windings being coupled with said measuring circuit.

7. In a control circuit as set forth in claim 6, wherein said biasing source includes a rectifier unit coupled with said power source, said unit being coupled with said one input winding, and said measuring circuit includes a rectifier assembly coupled with said other input winding, whereby direct current applied to said other input winding from the assembly electrically opposes direct current applied to said one input winding from the unit.

8. In a control circuit as set forth in claim 7, wherein said magnetic amplifier includes a saturable core, the impedance of said output winding being substantially decreased when the core is saturated, said biasing current applied to said one input winding being of magnitude biasing the core just below saturation in the absence of any current being applied to said other input winding from said assembly.

9. In a control circuit as set forth in claim 8, wherein said output winding is center-tapped providing a pair of output winding sections, first circuit means are provided coupling said device in series with the entire output winding, and second circuit means are provided coupling the center-tap of the output winding with one side of the power source and the ends of both output winding sections with the other side of the power source.

10. In a control circuit as set forth in claim 9, wherein said second circuit means includes rectifier elements for limiting current flow therein to one direction only.

11. In a control circuit as set forth in claim 9, wherein said first circuit means includes rectifier elements for limiting current flow therein to one direction only.

12. In a control circuit as set forth in claim 11, wherein said second circuit means couples said other side of the power source with both sides of the first circuit means and includes rectifier elements disposed to limit flow of current between said other side of the power source and the two sides of the first circuit means to one direction only and to alternate half-cycles for each side of the first circuit means.

References Cited in the file of this patent

UNITED STATES PATENTS

| | | |
|---|---|---|
| 2,471,929 | Breitenstein | May 31, 1949 |
| 2,706,765 | Lengvenis | Apr. 19, 1955 |
| 2,757,320 | Schuh | July 31, 1956 |
| 2,765,436 | Dornhoefer | Oct. 2, 1956 |